United States Patent [19]
Kellam

[11] 4,262,956
[45] Apr. 21, 1981

[54] VEHICLE WITH RAISABLE ROOF

[76] Inventor: L. Birt Kellam, 27 Arrowhead Estates, Chesterfield, Mo. 63017

[21] Appl. No.: 892,980

[22] Filed: Apr. 3, 1978

[51] Int. Cl.³ .............................................. B62D 33/08
[52] U.S. Cl. ..................................................... 296/26
[58] Field of Search ............. 296/26, 27, 23 C, 137 B, 296/137 C; 52/72

[56] References Cited
U.S. PATENT DOCUMENTS

| | | |
|---|---|---|
| 2,483,332 | 9/1949 | Brumbaugh . |
| 2,729,497 | 1/1956 | Runyan . |
| 3,212,813 | 10/1965 | Peterson .......................... 296/137 B |
| 3,324,610 | 6/1967 | Adams ..................................... 52/72 |
| 3,765,716 | 10/1973 | Van Gompel ................... 296/137 B |

*Primary Examiner*—Robert R. Song
*Attorney, Agent, or Firm*—Polster, Polster and Lucchesi

[57] ABSTRACT

A raisable roof structure for a van which includes a secondary roof, a pair of outwardly hinging panels at both the front and rear of the roof structure, and a pair of inwardly hinging panels on both sides. When the secondary roof is lowered and the side panels are folded in, they form a smooth, finished interior for the van. A motor and special hidden mechanisms raise and lower the secondary roof structure.

12 Claims, 8 Drawing Figures

VEHICLE WITH RAISABLE ROOF

BACKGROUND OF THE INVENTION

This invention relates to a raisable top for a vehicle, and has particular applicability to such tops installed in vans to give adequate headroom when the van is used as a recreational vehicle.

Raisable van tops have become increasingly popular in recent years. They make the van low enough to be kept in a standard garage and yet allow it to be converted rapidly to a recreational vehicle having sufficient height to permit occupants to walk about freely.

A number of designs have been proposed or are in actual use. One such design is shown in Cripe, U.S. Pat. No. 3,377,100 (1968), and another is used in the van conversion system sold by Campers Conversions, Inc., Barrington, Ill.

All of the previous raisable top designs have suffered from one or more disadvantages. Some require a secondary (raisable) roof which is too tall to fit in a standard garage even when the secondary roof is lowered. Most lack stability during the raising and lowering operations. Most also use flexible material in the side panels rather than solid panels. All are somewhat unattractive inside when the secondary roof is lowered. This last disadvantage is particularly important with many modern vans which may be lavishly decorated and which may have all the interior surfaces carpeted.

SUMMARY OF THE INVENTION

One of the objects of this invention is to provide a vehicle, such as a van, with an improved raisable roof structure.

Another object is to provide such a vehicle in which the roof structure adds very little height to the vehicle.

Another object is to provide such a vehicle in which solid, durable panels bridge the space between the vehicle roof and the raisable roof structure when the raisable roof structure is in its raised position.

Another object is to provide such a vehicle in which the raisable roof structure is securely supported and aligned by the bridging panels when the roof is in a lowered position, a raised position or at any intermediate position.

Another object is to provide such a vehicle having a smooth, finished interior when the raisable roof structure is lowered, and which may include windows in the bridging panels between the roof of the vehicle and the raisable roof structure.

Another object is to provide such a vehicle in which the mechanism for raising and lowering the roof may be power operated as well as manually operated and may be hidden or unobtrusive.

Another object is to provide such a vehicle in which the raising and lowering of the roof structure is simplified.

Other objects will become apparent in light of the following description.

In accordance with this invention, generally stated, a vehicle is provided which includes a vehicle roof, an opening in the vehicle roof, a secondary roof structure covering the opening, means for raising and lowering the secondary roof structure, forward and rearward closure members bridging the space between the roof and the secondary roof structure and a pair of side closure members bridging the space between the roof and the secondary roof structure, in which the forward and rearward closure members comprise an upper rigid panel and a lower rigid panel hinged to each other, to the roof and to the secondary roof structure, and being constructed to fold outwardly from the opening over the vehicle roof when the secondary roof structure is in its lowered position, and in which the side closure members comprise an upper rigid panel and a lower rigid panel hinged to each other, to the roof and to the secondary roof structure, and being constructed to fold inwardly over the opening when the secondary roof structure is in its lowered position. The term "rigid" is used herein to mean that the panels are self-supporting. Because the pairs of upper and lower rigid panels comprising each closure member are hingedly mounted to each other, the vehicle roof and the secondary roof in all vertical positions of the secondary roof (lowered, raised and intermediate positions), they not only support the secondary roof structure but also give it great stability and keep it properly aligned in all its vertical positions.

The secondary roof structure preferably includes a lowered central panel extending from front to rear of the secondary roof structure. The central panel is sized to fill the space between the side closure panels when the secondary roof structure is in its lowered position, so as to form a smooth ceiling for the van. Interlocking means are provided on the side closure panels and the central panel to lock the roof in its lowered position. The central panel provides additional rigidity for the secondary roof structure. It may also act as a wireway and may provide space for vents, glass panels, lights, insulation and in one version the motor for the power operation of the secondary roof.

The side closure members may include windows in the upper panels and a finished surface such as carpeting, on the inner face of the lower panels. When the panels fold inwardly, the windows are hidden and the finished surface on the lower panels is continuous with the central panel. Because the forward and rearward panels fold outwardly from the opening in the roof, they may include windows in both their upper panels and lower panels. When the panels fold outwardly, they overlie the vehicle roof and are covered by the secondary roof structure.

DESCRIPTION OF THE PREFERRED EMBODIMENTS

Figure 1:
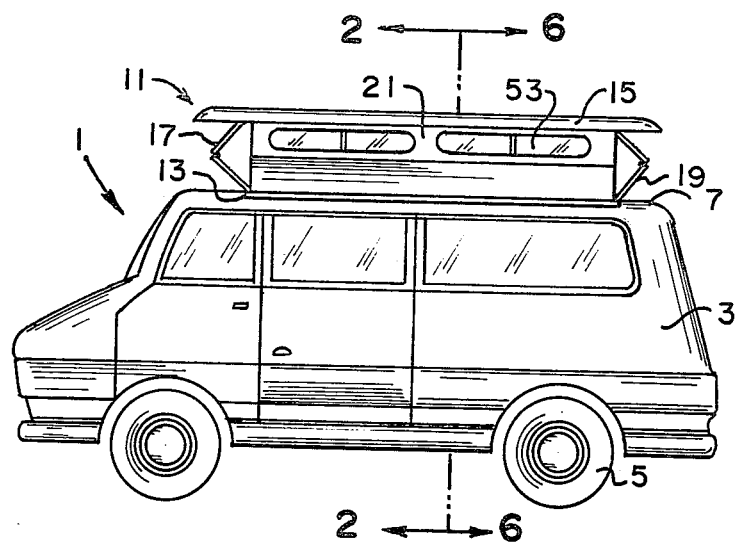
FIG. 1 is a view in side elevation of a van embodying the present invention, with a secondary roof structure in a partially raised position.
Figure 2:
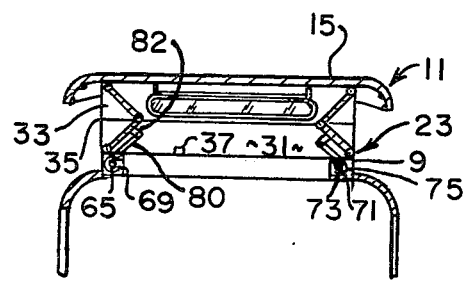
FIG. 2 is a somewhat diagrammatic sectional view taken along the line 2—2 of FIG. 1.
Figure 3:
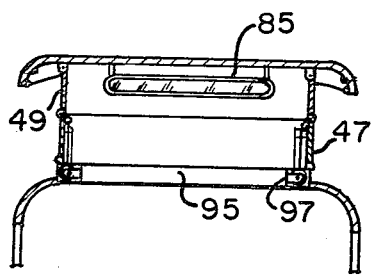
FIG. 3 is a somewhat diagrammatic sectional view, corresponding to FIG. 2, showing the secondary roof structure in a raised position.
Figure 4:
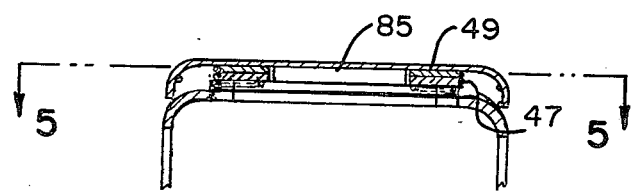
FIG. 4 is a somewhat diagrammatic sectional view, corresponding to FIG. 2, showing the secondary roof structure in a lowered position.

Referring now to the drawings, reference numeral 1 indicates a van embodying the present invention. The van 1 includes, inter alia, a body 3, wheels 5, an internal combustion engine (not shown), and a roof 7. A rectangular opening 9 is provided in the roof 7. The opening 9 may be about sixty inches wide and ten feet long.

A secondary roof assembly 11 includes a frame 13, a raisable secondary roof structure 15 over the opening 9, a forward closure member 17, a rear closure member 19, a pair of side closure members 21, and a lift mechanism 23 for raising and lowering the secondary roof structure.

The frame 13 includes angle irons 25 resting upon and secured to the roof 7 around the edge of the opening 9. The angle irons support a raised frame 26 having a typical height of three inches. The frame is preferably sized in such a way that the top of its front rail is flush with the highest surface of the van roof 7.

The secondary roof structure 15 is sized and shaped to extend somewhat beyond the opening 9 and includes a depending lip 27 around its periphery. The secondary roof structure 15 is so contoured that when it is in its lowered position the lip 27 engages or nearly engages the roof 7, with the side portions of the secondary roof structure 15 extending over the sides of the roof 7. Preferably, the secondary roof structure 15 is substantially the same size as the primary roof and blends with it in the lowered position. A rubber gasket 29 around the inner periphery of the lip provides a seal with the roof 7 when the secondary roof structure 15 is in its lowered position.

The forward closure member 17 includes a lower panel 31 permanently hinged to the upper edge of the raised frame 26 and an upper panel 33 permanently hinged to the secondary roof structure 15 about fourteen inches behind the front lip of the secondary roof structure 15. Each panel is twelve inches high. The lower panel 31 is hinged to the upper panel 33 by a continuous hinge 35. A leaf spring 37 biases the lower panel 31 outward toward the front of the van 1.

The rear closure member 19 includes a lower panel 39 permanently hinged to the upper edge of the raised frame 26 and an upper panel 41 permanently hinged to the secondary roof structure 15 about fourteen inches in front of the rear lip of the secondary roof structure 15. Each panel is twelve inches high. The lower panel 39 is hinged to the upper panel 41 by a continuous hinge 43. A spring 45 biases the lower panel 39 outward toward the rear of the van 1.

Each side closure member 21 includes a lower panel 47 permanently hinged to the upper edge of the raised frame 26 by a hinge member 48 extending the length of the lower panel 47, and an upper panel 49 hinged to the secondary roof structure 15 adjacent the side lip of the secondary roof structure 15 by a hinge member 50. Each panel is twelve inches high. The lower panel 47 is hinged to the upper panel 49 by a continuous hinge 51, arranged to permit the panels 47 and 49 to hinge inward.

Each upper panel 33, 41 and 49 includes windows 53, which may be made of glass or other transparent material.

Figure 6:
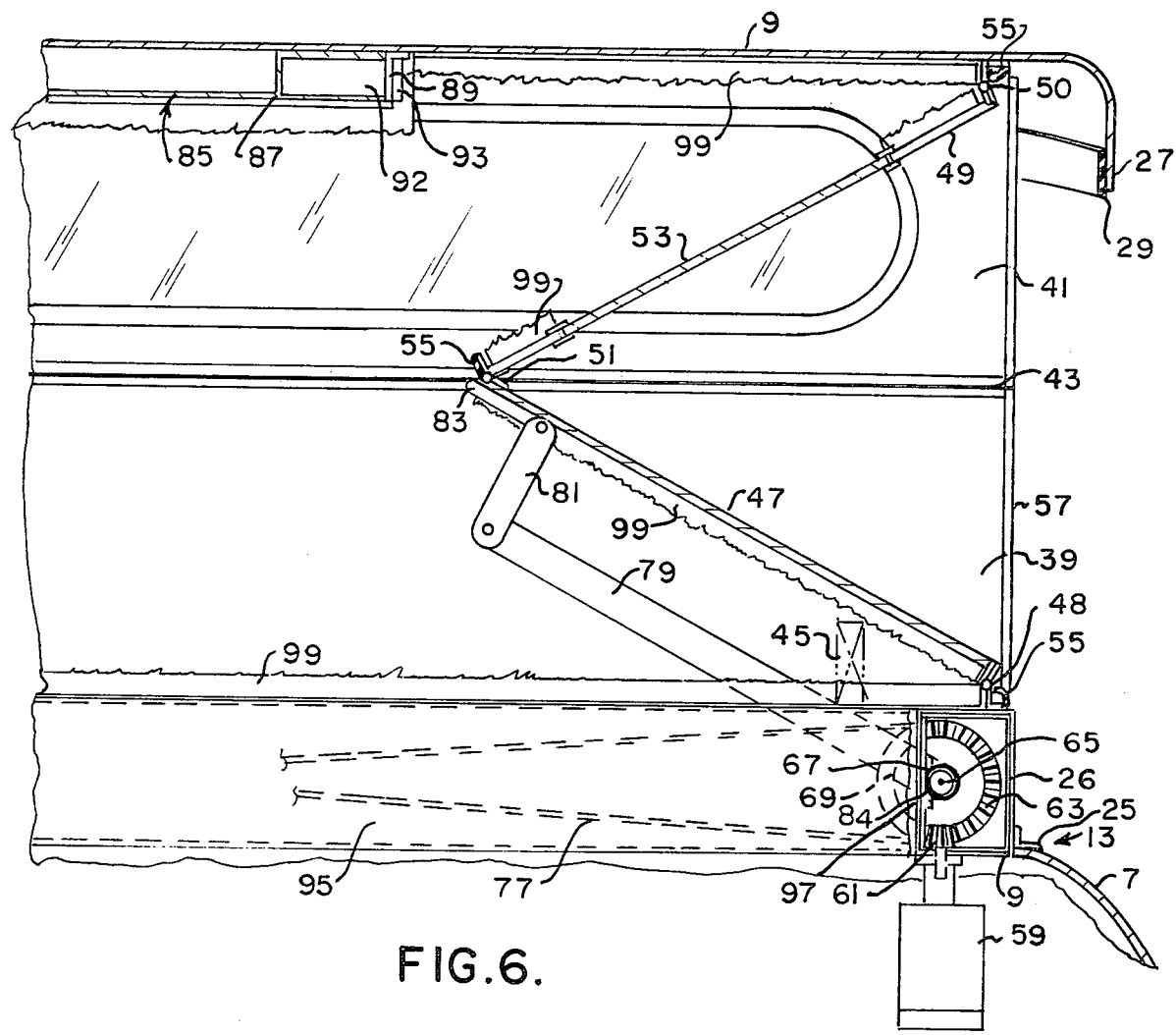
FIG. 6 is a detail, corresponding generally to FIG. 2, showing portions of a side closure member and a lifting mechanism for raising and lowering the secondary roof structure.
Figure 5:
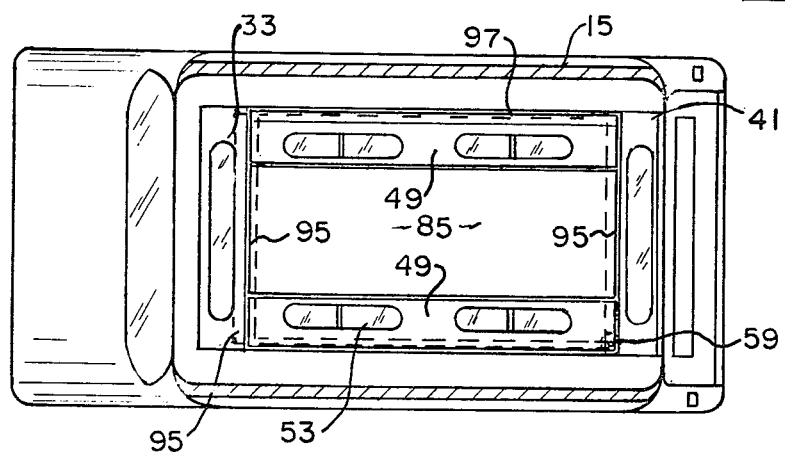
FIG. 5 is a sectional view taken along the line 5—5 of FIG. 4.

Rubber gasketing, indicated at 55 in FIG. 6, is provided along the upper edge of each upper panel, along the lower edge of each lower panel, and between each of the upper and lower panels, to seal the closure members 17, 19 and 21 when the secondary roof structure 15 is raised. Further gasketing, indicated at 57, is provided along the inside vertical edges of the front and rear closure members 17 and 19, to form a seal with the front and rear edges of the side closure members 21 when the secondary roof structure 15 is raised.

The lift mechanism 23 includes an electric motor 59 mounted at the rear of the van 1. The motor 59 may be an ordinary direct current gear motor activated by controls, not shown, within the van 1, and deactivated by limit switches tripped by movement of the lower side panels 47 to their fully raised and fully lowered positions. The rotor shaft of motor 59 carries a gear 61 which drives a second gear 63. The gear 63 is affixed to a shaft 65 extending longitudinally along and within one side of the raised frame 26 and journaled in bearings 67. The shaft 65 also carries a pulley 69, adjacent the gear 63 and a pulley 70 at its forward end. A shaft 71, identical with the shaft 65 and mounted longitudinally of the van 1 on the other side of the raised frame 26 and journaled in bearings 73, carries identical pulleys 75 and 76. The pulleys 69 and 75 are connected to each other by a cable 77, and the pulleys 70 and 76 are likewise connected to each other by a cable 78, to coordinate the rotation of the shafts 65 and 71.

Each shaft 65 and 71 carries activating arms 79 and 80 secured to it. The activating arms are positioned immediately forward of the pulleys 69, and the activating arms 80 are positioned immediately behind the pulleys 70. Connecting arms 81 and 82 are pivotally connected to the activating arms 79 and 80 respectively, and to the lower side panels 47. Locking pins 83, rigidly carried by the lower side panels 47 adjacent their forward and rear edges, lock the secondary roof structure 15 in its lowered position, as described hereinafter. Coil springs 84 on shafts 65 and 71 bias the shafts to lift the lower side panels 47. The springs 84 are stronger than springs 37 and 45. Thus, in the absence of the locking pins 83 and the frictional restraint of the gear motor 59, the secondary roof assembly 11 would be biased into its raised position.

The secondary roof structure 15 also includes a lowered central panel or filler 85 extending longitudinally of the secondary roof structure 15 and sized to fill the space between the side closure members 21 when the secondary roof structure is in its lowered position. The filler 85 includes a lower wall 87 and side walls 89. The lower wall 87 forms, with the side walls 89 a wireway 92 for lights and electrical outlets, not shown. The central part of the filler 85 includes closable vents and is in part accessible through doors in the lower wall 87 for use as a storage space. At the forward and rear ends of the filler 85, sockets 93 are provided for receiving the locking pins 83.

Boxes 95, defined in part by the raised frame 26, extend across the front and rear of the raised frame 26. The boxes 95 enclose the gear 63, the pulleys 69, 70, 75 and 76 and the cable 77. Slots along the forward edge of the rear box 95 receive the activating arms 79 and the connecting arms 81 when the secondary roof structure 15 is in its lowered position. Boxes 97, defined in part by the raised frame 26 and extending along the longitudinal sides of the raised frame 26 enclose the shafts 65 and 71.

As shown in FIG. 6, the interior of the van 1 is completely covered with carpeting 99. In particular, the carpeting 99 covers the exposed inside surfaces of the secondary roof structure 15, the filler 85, the forward closure member 17, the rear closure member 19, the side closure members 21, the raised frame 26, and the boxes 95 and 97. Therefore, when the secondary roof structure 15 is in its lowered position, all of the windows in the closure members and all of the lift mechanism 23 are hidden, and the roof of the van presents a completely finished appearance.

The secondary roof assembly 11, including the secondary roof structure and the closure panels, may be constructed of sheet steel, fiberglass, aluminum, wood or other rigid material. The assembly may be installed at the time the van 1 is manufactured or may be added later.

The operation of the secondary roof assembly 11 is obvious from the foregoing description. Preferably, the locking pins 83 and sockets 93 are arranged to provide merely a frictional detent, although a manually releasable lock may be substituted. Upon activation of the motor 59, the side closure members 21 are lifted by the lift mechanism 23 and the front and rear closure members 17 and 19 are lifted by the secondary roof structure 15 against the bias of springs 37 and 45. The secondary roof structure 15 is locked in its raised position by the closure members 17, 19 and 21, and by the gears 61 and 63. When the motor 59 is activated to lower the secondary roof structure 15, the side closure members 21 are lowered by the lift mechanism 23 against the bias of springs 84, and the front and rear closure members 17 and 19 are biased outwardly by springs 37 and 45.

Figure 7:
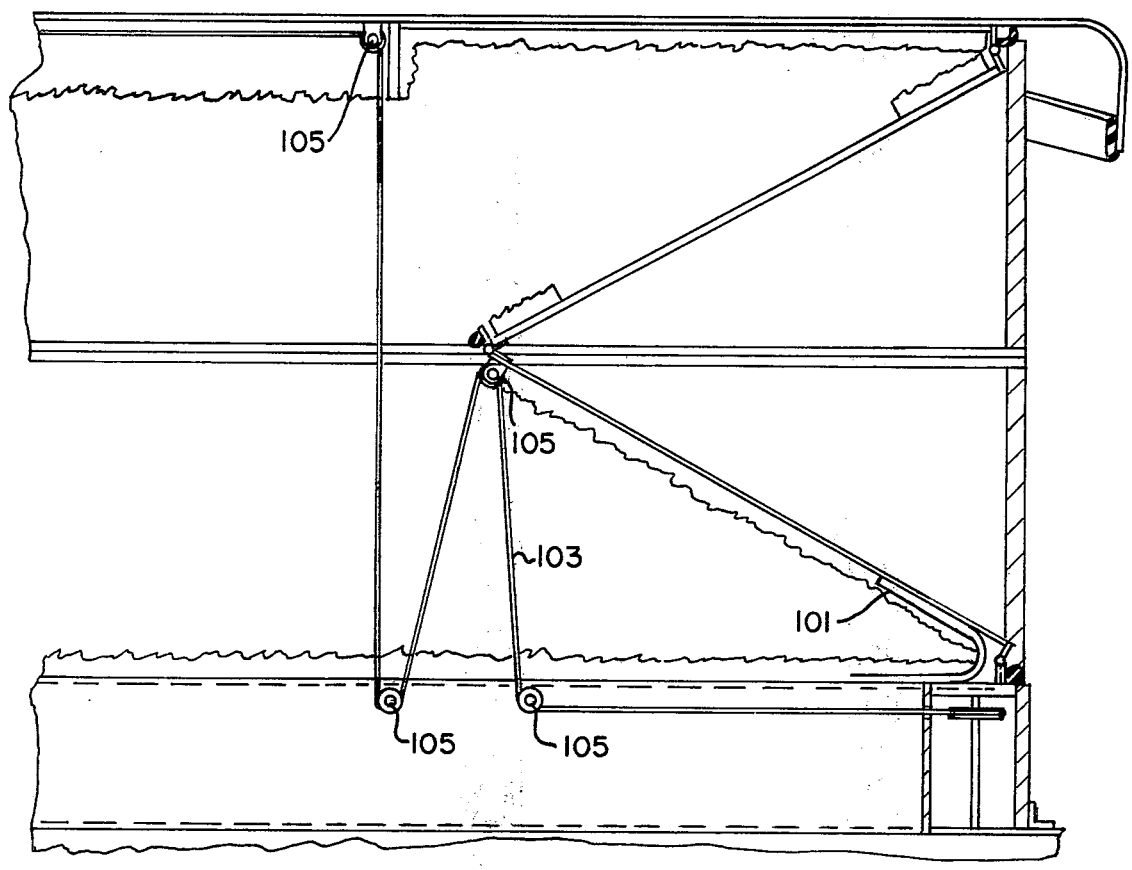
FIG. 7 is a detail corresponding to FIG. 6 showing an alternate lifting mechanism.
Figure 8:
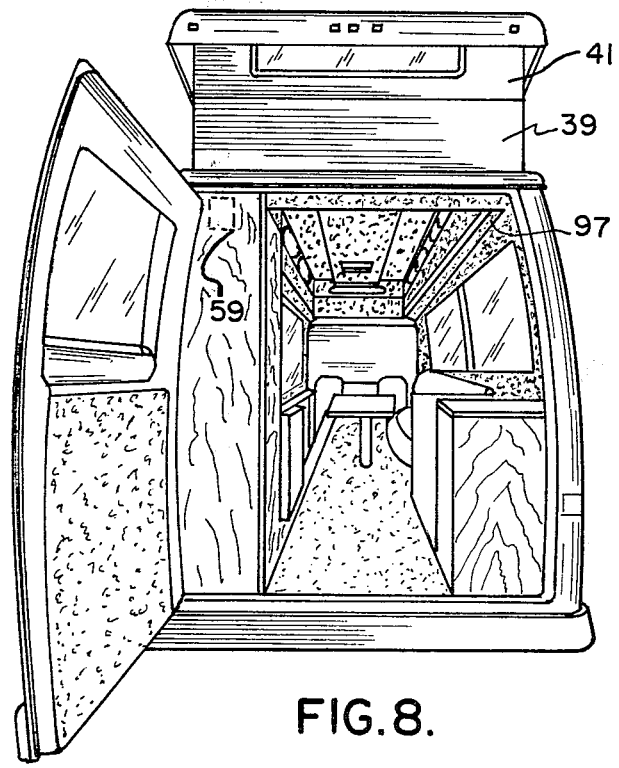
FIG. 8 is a view in perspective of the van of FIGS. 1-7, with a rear door open to show the interior of the van with the secondary roof structure in a raised position.

Numerous variations in the vehicle secondary roof assembly of the present invention will occur to those skilled in the art in light of the foregoing disclosure. Merely by way of example, as shown in FIG. 7, the lift mechanism may be modified by substituting leaf springs 101 for coil springs 84 to bias the lower side panels 47 up, and replacing the arms 79 and 81 with an arrangement of wire cable 103 and pulleys 105 for lowering the roof against the bias of the leaf springs 101. Connection to a similar arrangement at the front of the secondary roof structure 15 is by cable and pulleys rather than by longitudinally extending shafts. The motor of this modification winds the rope around a spindle to lower the secondary roof structure 15, and unwinds the rope to raise it. The motor is contained in the filler space 85. On vehicles having a secondary roof structure 15 smaller than that of the preferred embodiment, this modified lift mechanism may be connected merely to the rear of the secondary roof structure 15, and the longitudinally extending connection to the front of the secondary roof structure 15 may be omitted. It will be seen that in these modifications the lift mechanism may be hidden when the secondary roof structure 15 is in its lowered position, in the same manner as in the preferred embodiment.

As other examples of variations, the carpeting on the interior of the secondary roof assembly may be omitted, and the exposed surfaces may be given any finish compatible with the interior of the van or other vehicle. The leaf springs 37 and 45 may be omitted if the gasketing 55 provides sufficient outward bias to the front and rear panels. The filler 85 may be modified to provide water lines or other desired services, or it may be made in part of transparent material and sky lights provided in the secondary roof structure 15. Windows may be provided in the lower panels of the front and rear closure members. A crank and ratchet arrangement may be substituted for the gear motor 59, although this arrangement would lack some of the advantages of the preferred embodiment. The invention may also be applied to vehicles other than vans and still retain many of its advantages. As applied to larger vehicles, such as large trailers, the closure members may be considerably larger, for example six feet high, and the secondary roof assembly may provide a second level of living space in the vehicle. These variations are merely illustrative.

I claim:
1. In a vehicle comprising:
   (a) a vehicle roof;
   (b) an opening in said roof;
   (c) a secondary roof structure covering said opening;
   (d) means for raising said secondary roof structure to a raised position spaced above said vehicle roof and lowering said secondary roof structure to a lowered position adjacent said roof;
   (e) forward and rearward closure members for bridging the space between said roof and said secondary roof structure when said secondary roof structure is in its raised position; and
   (f) a pair of side closure members for bridging the space between said roof and said secondary roof structure when said secondary roof structure is in its raised position,
   the improvement wherein each of said four closure members is constructed of upper and lower rigid panels hinged to each other, to said roof and to said secondary roof structure, all four of said closure members moving solely by pivoting as said secondary roof structure is raised and lowered, without any sliding motion relative to said roof or said secondary roof structure, said forward and rearward closure members being constructed to fold outwardly from said opening over said roof when said secondary roof structure is in its lowered position and said side closure members being constructed to fold inwardly over said opening when said secondary roof structure is in its lowered position, whereby said secondary roof structure is maintained stable and aligned with said roof and said opening at all positions of travel of said secondary roof structure, said means for raising said secondary roof structure comprising lift means connected to at least one of said lower side panels, said side panel transmitting a lifting force from said lift means to said secondary roof structure to raise said secondary roof.

2. The vehicle of claim 1 wherein said lift means are connected to both said lower side panels.

3. The vehicle of claim 2 wherein said lift means comprise motor and linkage means operatively connected to said motor and to each of said lower side panels.

4. The vehicle of claim 3 wherein said linkage means comprise a rod, first arm means on each said rod at the front of said lower side panel for connecting said rod to said lower side panel and second arm means on each said rod at the rear of said lower side panel for connecting said rod to said panel.

5. The vehicle of claim 1 wherein said vehicle is a self-propelled van.

6. A vehicle comprising:
   (a) a vehicle roof;
   (b) an opening in said roof;
   (c) a secondary roof structure covering said opening;
   (d) lift means for raising said secondary roof structure to a raised position spaced above said vehicle roof and lowering said secondary roof structure to a lowered position adjacent said roof;

(e) forward and rearward closure members for bridging the space between said roof and said secondary roof structure when said secondary roof structure is in its raised position, each of said forward and rearward closure members comprising a pair of rigid panels hinged to each other, to said roof and to said secondary roof structure in all positions of said secondary roof structure, said forward and rearward closure members being constructed to fold outwardly from said opening over said roof when said secondary roof structure is in its lowered position; and (f) a pair of side closure members for bridging the space between said roof and said secondary roof structure and for supporting said secondary roof structure when said secondary roof structure is in its raised position, each of said side closure members comprising an upper rigid panel and a lower rigid panel hinged to each other, to said roof and to said secondary roof structure in all positions of said secondary roof structure, said side closure members being constructed to fold inwardly over said opening when said secondary roof structure is in its lowered position, said lift means comprising a motor and linkage means operatively connected to said motor and to each of said lower side panels for lifting said side panels, hence said secondary roof structure, said linkage means comprising a pair of rods, first arm means on each said rod at the front of said panel for connecting said rod to said panel, second arm means on each said rod at the rear of said panel for connecting said rod to said panel, and box means for enclosing said rods and for enclosing said arm means when said secondary roof structure is in its lowered position.

7. A vehicle comprising:
(a) a vehicle roof;
(b) an opening in said roof;
(c) a secondary roof structure covering said opening;
(d) lift means for raising said secondary roof structure to a raised position spaced above said vehicle roof and lowering said secondary roof structure to a lowered position adjacent said roof;
(e) forward and rearward closure members for bridging the space between said roof and said secondary roof structure when said secondary roof structure is in its raised position, each of said forward and rearward closure members comprising a pair of rigid panels hinged to each other, to said roof and to said secondary roof structure in all positions of said secondary roof structure, said forward and rearward closure members being constructed to fold outwardly from said opening over said roof when said secondary roof structure is in its lowered position; and
(f) a pair of side closure members for bridging the space between said roof and said secondary roof structure and for supporting said secondary roof structure when said secondary roof structure is in its raised position, each of said side closure members comprising an upper rigid panel and a lower rigid panel hinged to each other, to said roof and to said secondary roof structure in all positions of said secondary roof structure, said side closure members being constructed to fold inwardly over said opening when said secondary roof structure is in its lowered position, said lift means comprising a motor and linkage means operatively connected to said motor and to each of said lower side panels for lifting said side panels, hence said secondary roof structure, said linkage means comprising cables and pulleys attached to said vehicle and to said lower side panels.

8. A vehicle comprising:
(a) a vehicle roof;
(b) an opening in said roof;
(c) a secondary roof structure covering said opening;
(d) means for raising said secondary roof structure to a raised position spaced above said vehicle roof and lowering said secondary roof structure to a lowered position adjacent said roof;
(e) forward and rearward closure members for bridging the space between said roof and said secondary roof structure when said secondary roof structure is in its raised position; and
(f) a pair of side closure members for bridging the space between said roof and said secondary roof structure and for supporting said secondary roof structure when said secondary roof structure is in its raised position, each of said side closure members comprising a pair of rigid panels hinged to each other, to said roof and to said secondary roof structure in all positions of said secondary roof structure, said side closure members being constructed to fold inwardly over said opening when said secondary roof structure is in its lowered position, said secondary roof structure including a lowered central panel extending front-to-rear of said vehicle, said central panel being sized to fill the space between the side closure members when said secondary roof structure is in its lowered position.

9. The vehicle of claim 8 wherein said side closure members include an upper panel and lower panel and said lowered central panel and said lower side panels are covered with the same material.

10. The vehicle of claim 9 wherein each of said upper side panels includes a window, said window being hidden by said lower side panels when said secondary roof structure is in its lowered position.

11. The vehicle of claim 8 wherein each of said forward and rearward closure members comprises a pair of rigid panels hinged to each other, to said roof and to said secondary roof structure in all positions of said secondary roof structure, said forward and rearward closure members being constructed to fold outwardly from said opening over said roof when said secondary roof structure is in its lowered position.

12. In a vehicle comprising:
(a) a vehicle roof;
(b) an opening in said roof;
(c) a secondary roof structure covering said opening;
(d) means for raising said secondary roof structure to a raised position spaced above said vehicle roof and lowering said secondary roof structure to a lowered position adjacent said roof;
(e) forward and rearward closure members for bridging the space between said roof and said secondary roof structure when said secondary roof structure is in its raised position; and
(f) a pair of side closure members for bridging the space between said roof and said secondary roof structure when said secondary roof structure is in its raised position, the improvement wherein each of said side closure members is constructed of upper and lower rigid panels hinged to each other, to said roof and to said secondary roof structure, and constructed to fold inwardly over said opening when said secondary roof structure is in its lowered position, and wherein said means for raising said secondary roof structure comprise a motor and linkage means connecting said motor to said lower side panels, said lower side panels transmitting a lifting force from said linkage means to said secondary roof structure to lift said secondary roof structure.

* * * * *